(12) United States Patent
Pastor et al.

(10) Patent No.: US 11,609,422 B2
(45) Date of Patent: Mar. 21, 2023

(54) OPTOELECTRONIC SENSOR AND METHOD OF DETECTING OBJECTS (71) Applicant: SICK AG, Waldkirch (DE)

(72) Inventors: Sebastian Pastor, Waldkirch (DE); Kay Fürstenberg, Waldkirch (DE)

(73) Assignee: SICK AG, Waldkirch (DE)

( * ) Notice: Subject to any disclaimer, the term of this patent is extended or adjusted under 35 U.S.C. 154(b) by 735 days.

(21) Appl. No.: 16/594,638

(22) Filed: Oct. 7, 2019

(65) Prior Publication Data
US 2020/0110259 A1    Apr. 9, 2020

(30) Foreign Application Priority Data

Oct. 9, 2018   (DE) .......................... 102018124835.0

(51) Int. Cl.
*G01S 17/04* (2020.01)
*G02B 26/10* (2006.01)
*G01S 7/481* (2006.01)
*G01S 17/89* (2020.01)
*G02B 27/10* (2006.01)

(52) U.S. Cl.
CPC .......... *G02B 26/101* (2013.01); *G01S 7/4817* (2013.01); *G01S 17/04* (2020.01); *G01S 17/89* (2013.01); *G02B 27/10* (2013.01)

(58) Field of Classification Search
CPC ..... G02B 26/101; G02B 27/10; G01S 7/4817; G01S 17/04; G01S 17/89; G01S 7/497; G01S 17/42
See application file for complete search history.

(56) References Cited

U.S. PATENT DOCUMENTS 5,991,011 A * 11/1999 Damm .................... G01S 7/497
356/5.01
7,972,014 B2    7/2011 Hung et al.
(Continued)

FOREIGN PATENT DOCUMENTS

DE         4340756 A1    6/1994
DE       19757849 B4    12/2004
(Continued)

OTHER PUBLICATIONS

Office Action dated Aug. 9, 2019 issued in corresponding German Application No. 10 2018 124 835.0.

*Primary Examiner* — David P Porta
*Assistant Examiner* — Mamadou Faye
(74) *Attorney, Agent, or Firm* — Nath, Goldberg & Meyer; Jerald L. Meyer; Morgan D. Rosenberg (57) ABSTRACT

The invention relates to an optoelectronic sensor for detecting objects in a monitored zone that has a light transmitter; a deflection unit for deflecting the transmission light beam without mechanical moving parts or at most with micromechanical moving parts to scan the monitored zone; a light receiver; and a control and evaluation unit that is configured to determine information on the objects by means of the reception signal received by the light receiver. The sensor has at least one reference target that receives at least a portion of the deflected transmission light beam at at least one deflection angle of the deflection unit or returns it to the light receiver in order to generate a reference signal; and the control and evaluation unit is configured to check the operability of the deflection unit by means of the reference signal.

16 Claims, 5 Drawing Sheets

(56) References Cited

U.S. PATENT DOCUMENTS

| | | |
|---|---|---|
| 2011/0211243 A1 | 9/2011 | Smits |
| 2017/0244955 A1 | 8/2017 | Shpunt et al. |
| 2020/0249354 A1* | 8/2020 | Yeruhami ................. B60S 1/02 |
| 2021/0021099 A1* | 1/2021 | Vizbaras ............... H01S 5/0014 |

FOREIGN PATENT DOCUMENTS

| | | |
|---|---|---|
| DE | 10 2011 113 147 B3 | 1/2013 |
| DE | 102016006776 A1 | 11/2017 |
| EP | 2708914 A1 | 3/2014 |
| JP | 2002-90681 A | 3/2002 |
| JP | 2002-107452 A | 4/2002 |
| JP | 2004-157044 A | 6/2004 |
| JP | 2005-77288 A | 3/2005 |
| JP | 2013-160545 A | 8/2013 |
| JP | 2016-151422 A | 8/2016 |

* cited by examiner

OPTOELECTRONIC SENSOR AND METHOD OF DETECTING OBJECTS

The invention relates to an optoelectronic sensor and to a method of detecting objects in a monitored zone in accordance with the preamble of the respective independent claim.

Optical scanning has been used in laser scanners for a long time. In this respect, a light beam generated by a laser periodically sweeps over the monitored zone with the aid of a deflection unit and measures the distance from the scanned object using a time of flight process in each case. In a pulse process, light pulses are transmitted for this purpose and the duration between the time of transmission and the time of reception is measured. In a phase process, a periodic amplitude modulation and a measurement of the phase offset between the transmission light and the reception light takes place. In addition to the measured distance information, the angular position of the deflection unit and thus of the object is determined and measurement points having distance values and angular values in polar coordinates thus result after a scanning period. Three-dimensional measurement points are generated from a spatial zone by an additional variation or by a multibeam scanning at an angle of elevation. Compared to cameras, the scanning admittedly requires a specific measurement time particularly in the case of 3D detection; however, the measurement is concentrated on a point for this purpose and thereby acquires range and more reliable measurement values.

In most laser scanners, the scanning movement is achieved by a rotating mirror or by a mirror wheel having a plurality of facets. It is also known to have the entire measurement head, comprising one or more light transmitters and light receivers, rotate instead such as is described in DE 197 57 849 B4, for example. Again in other systems a deflection unit is pivoted to and from. However, any kind of mechanical movement results in a specific construction size and shock sensitivity and in a proneness to maintenance due to wear.

To avoid this, there are efforts in the prior art to design so-called solid state scanners, that is scanning systems without a rotating deflection unit or comparable moving mechanical parts. For example, the pulsed transmission light beam of a light source is guided over the area to be scanned in the X direction and in the Y direction by an MEMS mirror in EP 2 708 914 A1. The reflected light pulses are received by an image sensor having numerous pixels of which only those respective pixels are activated that observe a zone currently illuminated by the transmission light beam. A further special feature in EP 2 708 914 A1 is the use of SPADs (single photon avalanche diodes) for the pixels of the image sensor. SPADs are avalanche photodiodes that are operated in a so-called Geiger mode. For this purpose, they are preloaded above the breakdown voltage such that a single charge carrier released by a single photon can already trigger an avalanche that is no longer controlled and that then recruits all the available charge carriers due to the high field strength. SPADs are not only highly sensitive, but simultaneously also have a high integration capability.

An MEMS mirror is only one of many possibilities of implementing a beam deflection without moving mechanical parts. Other possibilities not mentioned exclusively are, for instance, optical phased arrays, acousto-optic modulators or electro-optic modulators. These beam deflections have the common feature that they at most generate a movement at a micromechanical level, as in the case of micromirrors, and each change their optical properties, for example, by an application of an electrical voltage in order to set the deflection angle. There is neither a motor nor are there mechanically moving parts such as a rotating mirror, a polygon mirror wheel or a pivot mechanism.

Self-monitoring such as, for example, described in DE 43 40 756 A1 is known from classical laser scanners having rotating mirrors. The fault-free distance measurement and its unimpaired sensitivity are checked by an internal reference target system. The reference target is optically scanned in each revolution of the deflection unit and the signal echo is evaluated with respect to the signal strength and the distance value. A dead angle zone in the rear housing part outside the scan zone is used for this purpose. This cannot be transferred to solid state scanners since there is no rear dead angle zone.

One aspect of self-monitoring is the compliance with eye protection requirements for strong light sources and in particular the laser light sources that are typically used. Higher limit values may be set for a moving light beam than with a static irradiation system since the light energy can only briefly act on the eye. However, this is only admissible when it is ensured that the light beam does in fact not dwell at a location due to malfunctions. In a classical laser scanner, the movement of the rotating mirror or of the driving motor is simply monitored for this purpose, especially since the current rotational position is anyway required for the association of the measurement values. A corresponding monitoring of movement is, however, impossible in a solid state scanner due to a lack of mechanically moving parts.

In connection with the time of flight process, it is also known to use reference targets for a completely different purpose, namely to compensate internal signal transit times and drifts by effects such as a change in temperature and aging. For this purpose, a reference time of flight is measured directly or indirectly on a well-defined internal reference path and the measured time of flight is thus corrected. The output power of the light source can also be determined in this manner. However, all of this does not allow any statement to be made regarding the spatially distributed light load in the environment of the sensor and thus regarding eye protection issues.

U.S. Pat. No. 7,972,014 B2 discloses a scanning projection apparatus which generates an image using micromechanically moving and modulated red, blue and green laser beams. A sensor is arranged in a dark region at the margin of the image region and detects a scanning line once per frame to eliminate distortion by phase differences between the controlled beam position and the actual beam position and to monitor the horizontal and vertical scanning for safety reasons. Such projection systems generate an image and do not serve for the optical detection of information on objects.

In a projection and illumination system in accordance with US 2011/0211243 A1, the laser beam is first guided onto a scanning mirror and is then guided outwardly via a so-called securing material which changes its optical properties through a concentrated laser performance. If the laser beam therefore dwells too long at a point, the securing material loses its reflective properties and the laser beam no longer exits the device. However, this is a very specific solution and it would be desirable to manage without such a securing material and construction spaces and beam guides coordinated therewith.

It is therefore the object of the invention to improve the reliability of a solid state scanner.

This object is satisfied by an optoelectronic sensor and by a method of detecting objects in a monitored zone in accordance with the respective independent claim. A transmission light beam is transmitted and the transmission light beam remitted from the objects is received again to acquire measurement information on the respective scanned object. To scan the monitored zone, a deflection unit deflects the transmission light beam into different deflection angles. This deflection unit is the equivalent of a conventional rotating mirror, but manages without mechanically moving parts, wherein micromechanical movements such as in an MEMS mirror are by all means still permitted. The sensor is accordingly configured as a solid state scanner. The scanning of the monitored zone follows an initially random pattern and can in this respect be uniform, but can also relate more frequently to specific part zones (ROI, region of interest) and not at all to others.

The invention starts from the basic idea of monitoring the deflection of the transmission light beam using an active reference target and/or a passive reference target. The reference target is part of the sensor and is therefore located in its housing or is at least connected thereto, for instance, at the outside to its front screen or to its frame. The reference target is located in an optical path of the transmission light beam or in a part decoupling thereof, and indeed there in the optical path where the deflection has already taken place. A test as to whether the deflection actually works is thus possible via the reference signal generated by means of the reference target in order to switch off the light transmitter, if required, or to report the malfunction. In addition to this test for a so-to-say frozen deflection, the reference signal can be used for further functional tests.

The invention has the advantage that a particularly fast movement of the transmission light beam is possible that provides more degrees of freedom for two-dimensional and three-dimensional scanning than a classical laser scanner having a rotating mirror. The sensor additionally allows a particularly compact manner of construction and an inexpensive sensor design. By monitoring the movement of the transmission light beam, the light transmitter can be switched off in good time in the event of a movement that is too slow or even a standstill in order to avoid damage to the health of persons and to ensure eye protection. In addition, an automatic error recognition simplifies the handling particularly on an integration into more complex higher-ranking systems.

The reference target is preferably configured as a light deflection means or as a reflector. A light deflection means is, for example, a prism, a light guide loop or the like that conducts the transmission light beam in a different direction, namely toward the light receiver. A reflector likewise reflects the transmission light beam directly or indirectly onto the light receiver. The actual light receiver which is used at most deflection angles for the scanning of the monitored zone and for the acquisition of measurement values can thus also generate the reference signal. The reference target itself is passive.

The reference target preferably returns the transmission light beam to a known angular degree. In a light deflection means, this can, for example, be achieved by damping or by blackening; in a reflector, this can be achieved by a specific reflectivity. This not only enables a binary statement as to whether the reference target was met, but also a gradual evaluation with reference to an expected level. In addition, the performance of the light transmitter can be monitored. A plurality of reference targets having different angular degrees of reflection with respect to which the transmission light beam is returned are particularly preferably provided. A corresponding level pattern of the reference target is then expected, which enables even more precise monitoring.

The reference target preferably has a reference light receiver that generates the reference signal. This is now a case of an active reference target; the reference signal is not generated in the light receiver for the detection of measurement values. The reference light receiver is preferably arranged directly in the transmission light beam, wherein a beam deflection therebetween is also conceivable, however. Mixed forms are conceivable that have both at least one passive reference target with a beam return onto the measuring light receiver and at least one active reference target that generates the reference signal itself.

The reference target is preferably arranged at a deflection angle that is disposed outside the scanned monitored zone. Due to this arrangement, the measurement is not disturbed. A preferred arrangement is remote from the deflection angle range of the scanning of the monitored zone. Since the scanning for the measurement value detection can also be restricted to part zones or ROIs with gaps therebetween, an arrangement of the reference target in such gaps is also possible. An alternative is an arrangement of the reference target at deflection angles that correspond to the monitored zone, which then results in additional small dead zones or at least local impairments of the scanning and of the measurement value detection. The negative effects can be restricted or practically excluded by a particular evaluation as will be explained below.

The control and evaluation unit is preferably configured to periodically scan a row with the aid of the deflection unit. The sensor is then a row scanner. The reference target is preferably located at the start and/or at the end of the row.

Alternatively, the control and evaluation unit is configured to scan a two-dimensional pattern with the aid of the deflection unit. An areal and thus more comprehensive scanning is thereby made possible. The two-dimensional pattern can of course be artificially restricted to a row; a row scanner then nevertheless results. A typical pattern provides scanning slightly offset rows or columns after one another and thus systematically scanning an area in the X-Y direction. In principle, however, any periodic and non-periodic pattern is conceivable that, for example, scans specific part zones more frequently than others up to a random pattern. In two-dimensional scanning, the reference target is preferably located at the corners or, as at least one strip or point by point, at the margin.

The reference target is preferably located at a front screen of the sensor. The front screen comprises all the relevant deflection angles in accordance with its intended purpose such that all the suitable locations for the reference target are available there, whether at the margin or within the deflection angles for the scanning of the monitored zone. The reference target is particularly preferably integrated in the front screen, for instance, as a reflective or partly reflective coating or structuring.

The reference target preferably has a pattern of partly reflective elements in an optical path of the transmission light beam at different deflection angles. This pattern is a kind of watermark and is, for example, applied to the front screen or to an optical element between the light transmitter and the front screen and it is superposed on the measurement. Under certain circumstances if the reception electronics and the evaluation electronics are able to do so, the part reflection at the front screen can be separated in time in the reception signal from the remitted transmission light beam returning at a later time. A different evaluation option comprises configuring the part reflection as weak enough that an individual measurement is not noticeably impaired by it. However, the pattern will then nevertheless be recognizable in an averaging of numerous measurements. A sufficiently dynamic scene such as in a mobile application at a vehicle, in particular an autonomous vehicle, or the like is a requirement for such an averaging.

The sensor preferably has a reference light transmitter to generate a reference light beam that is offset with respect to the transmission light beam and that is deflected by the deflection unit with the transmission light beam. In this instance, the transmission light beam is expanded by the additional reference light transmitter. Due to the offset, the reference light beam does not enter the monitored zone, but rather moves onto the reference target. The reference light transmitter can be configured as considerably weaker due to the shorter paths and in order to minimize optical crosstalk. Optical crosstalk can also be prevented by beam splitting, for instance, by means of beam coding or different wavelengths. In an embodiment, the reference light beam has a very significant offset so that a reference target is thus scanned that is disposed largely or completely remote from the outlet region for the transmission light beam. A further embodiment provides a reflector strip as a reference target in and extending in parallel with a row scanner having a slit-shaped outlet window such that the transmission light beam scans the linear monitored zone and the reference light beam scans the reflector strip in parallel. In the last-named example, the beam cross-section of the transmission light beam could be selected instead of a separate reference light transmitter such that the transmission light beam is incident on the reflector strip for the most part through the outlet window and simultaneously also in a sweeping manner.

The control and evaluation unit is preferably configured to deflect the transmission light beam at a deflection angle corresponding to the reference target with the aid of the deflection unit at a test point in time. Therefore, the actual measurement is interrupted again and again here, whether irregularly or cyclically after some frames, rows or measurement points in order to use the transmission light beam in a targeted manner for a reference measurement. In this instance, the reference target is disposed at a basically completely random location, preferably outside the deflection angles of the actual monitored zone, where possible also considerably remote therefrom. Provided that this location of the reference target can namely still be traveled to, it is extremely unlikely that the deflection unit otherwise demonstrates a malfunction.

The control and evaluation unit is preferably configured to check and/or to define an angular origin of the deflection angles by means of the reference signal. The reference target is located at a known position or at a known deflection angle that simultaneously corresponds to an X position or an (X,Y) position. Therefore, the scanning of the reference target can be used for a zero point adjustment by which the assumed coordinate system and the coordinate system actually traveled to by the deflection unit can be checked, calibrated or tracked.

The light receiver preferably has a plurality of light reception elements or pixels that are each associated with different deflection angles. An actual scanning principle is not used at the reception side in such a sensor, but the total monitored zone is rather simultaneously detected in which only one specific zone is illuminated by the transmission light beam in each case. The light reception elements are preferably SPADs having the advantages mentioned in the introduction of a particularly high sensitivity and integration capability.

The control and evaluation unit is preferably configured to only activate or read out those respective light reception elements that correspond to the respective current deflection angle of the transmission light beam. A kind of scanning principle is thus also implemented at the reception side. Due to the selective activation or the selective reading out, no reception signals that cannot contribute to the useful signal are generated or evaluated by light reception elements. As light receivers in a SPAD matrix, SPADs can be switched to inactive in that the preload is lowered below the breakdown voltage. They then lose sensitivity by a plurality of orders of magnitude and can therefore be considered as switched off. The switching to inactive also has the advantage that no unnecessary avalanches are triggered that only contribute to power consumption and heat development. However, it is also possible independently of the technique to leave the light reception elements active that are not required and to only not read out their reception signals or to not consider said signals in the evaluation. Instead of at the plane of the light receiver, it can also be optically ensured beforehand that the light reception elements that are not required do not receive any light, for instance, using an electro-optic shutter. However, dark noise is not eliminated in this manner and it can make up a substantial portion particularly with SPADs.

The sensor preferably has a second deflection unit to guide the remitted transmission light beam from the deflection angle onto the light receiver. A scanning principle is thus also provided at the reception side. Therefore, a single receiver is sufficient as a light receiver and very high-quality light receivers or complex and/or expensive electronic circuits can thus be used for its control and preparation in comparison with a pixel of a matrix arrangement. There is also the possibility of combining some few high-quality reception elements or reception elements connected in a complex and/or expensive manner to form the individual detector, for instance, to achieve a specific statistic for an increased robustness against external light events and dark events in the case of SPADs. The same techniques are available for the deflection at the reception side as for the deflection at the transmission side. The deflection unit particularly preferably brings about both the deflection of the transmission light and of the remitted transmission light in a dual function.

The control and evaluation unit is preferably configured to determine a time of flight (TOF) of the transmission light beam up to the reception of the remitted transmission light beam. The sensor thus becomes a distance-measuring sensor just as is typically the case with the classical laser scanners having rotating mirrors that can thus at least be replaced by a solid state scanner or, more precisely, here by a solid state LiDAR (light detection and ranging) sensor in some fields of application.

The control and evaluation unit is preferably configured to check the distance of the reference target. The reference target therefore no longer only serves to monitor the operability of the deflection unit, but the total measurement path is rather checked. As already mentioned above, the light transmitter can also be monitored via a defined expected level of the reference signal. If the sensor does not measure distances, but rather other object properties such as contrast or color, such properties of the reference target can also be monitored. Such self-monitoring is in particular relevant in the sector of personal safety or in mobile applications such as in autonomous vehicles.

The method in accordance with the invention can be further developed in a similar manner and has similar advantages in this respect. Such advantageous features are described in an exemplary, but not exclusive manner in the subordinate claims dependent on the independent claims.

The invention will be explained in more detail in the following also with respect to further features and advantages by way of example with reference to embodiments and to the enclosed drawing. The Figures of the drawing show in:

FIG. 7f an exemplary arrangement of a reference target at any desired location that is separately traveled to;

Figure 1:
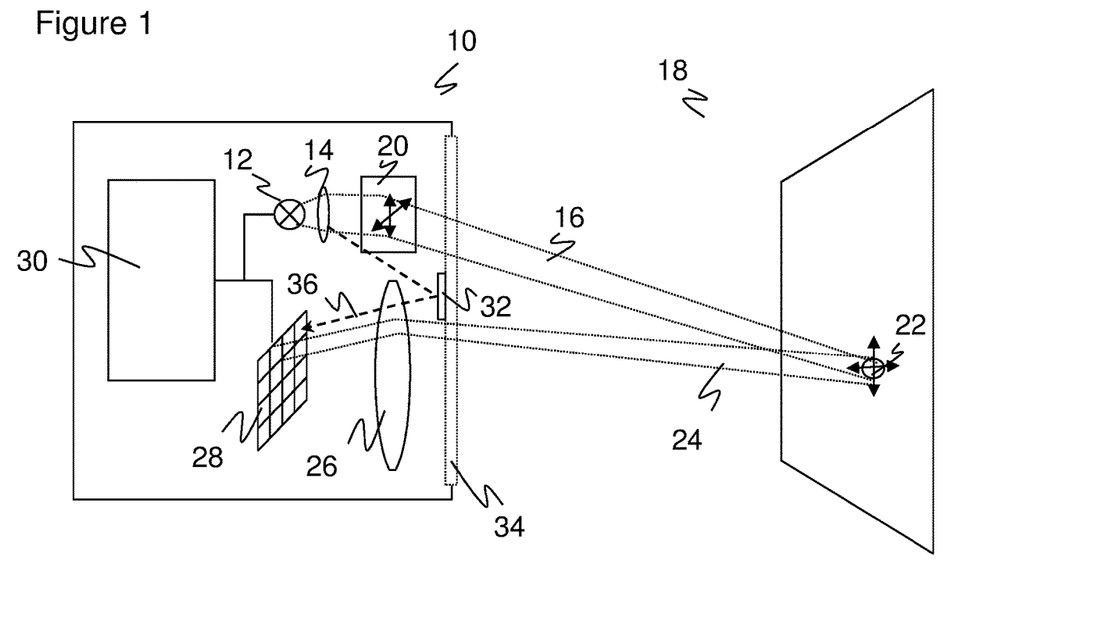
FIG. 1 a schematic representation of an optoelectronic sensor with transmission beam deflection without moving mechanical parts and with an internal reference target.

FIG. 1 shows a schematic representation of an optoelectronic sensor 10 or of a solid state scanner. With a light transmitter 12 that is typically high in luminosity and in particular has a laser source, a transmission light beam 16 is transmitted through a transmission optics 14 into a monitored zone 18. The transmission light beam 16 can be aligned with a desired variable measurement point 22 with the aid of a deflection unit 20. With corresponding scanning patterns, a linear or an areal monitored zone 18 is thereby scanned after one another, wherein an almost random different scanning pattern is also conceivable.

The deflection unit 20 is only shown schematically. There are the most varied implementation options for this purpose, such as a Piezo actuation system that changes the lateral position of the transmission optics 14 or, as it is the relative position therebetween that is important, the lateral position of the light transmitter 12. Further non-exclusive examples are additional optical elements such as an MEMS mirror, a switchable liquid crystal element, an optical phased array, an acousto-optic modulator, an electro-optic modulator or a liquid lens in which the boundary layer between two media that cannot be mixed can be tilted by controlling an electrode arrangement. In any event, the deflection unit 20 manages without macroscopic movable parts such as a rotating mirror or the like.

If the transmission light beams 16 are now incident on objects in the monitored zone 18, they are reflected back to the sensor 10 as remitted transmission light beams 24. The remitted transmission light beams 24 move through a reception optics 26 onto a light receiver 28. The reception optics 26, as already the transmission optics 14, is only represented by a simple lens that is representative of any desired optics having multi-lens objectives or diaphragms and of other optical elements. A reflective or diffractive optics is also conceivable. The basic optical design having a light transmitter 12 and a light receiver 28 biaxially disposed next to one another is also not compulsory and can be replaced by any construction shape known per se from single-beam optoelectronic sensors. A coaxial arrangement with or without a beam splitter is an example of this.

The light receiver 28 has a plurality of light reception elements and is preferably configured as a SPAD array. SPADs are highly sensitive and have a high integration capability and they offer the possibility of becoming practically inactive by lowering the preload below the breakdown voltage. Only those respective SPADs can thereby be switched to active that correspond to the desired measurement point 22 and thus to the expected place of incidence of the remitted transmission light beams 24. Alternatively to a SPAD array, a multiple arrangement of photodiodes or APDs or a different matrix receiver, for example in CCD or CMOS technology, is conceivable in which only specific pixels or pixel groups are then possibly read out in accordance with desired measurement points. This advantageous restriction of the visual field in each case to the measurement point 22 that is currently illuminated reduces the power loss and increases the resistance to external light. Alternatively, the visual field can also be optically restricted to darken non-illuminated zones, for example, using an electro-optic shutter.

A control and evaluation unit 30 is connected to the light transmitter 12 and to the light receiver 28. The deflection unit 20 is thus controlled to direct the transmission light beam 16 to the desired measurement point 22 in each case. The reception signals preferably only of the light reception elements or SPADs actually illuminated by the remitted transmission light beam 24 are evaluated to determine a time of flight from the measurement point 22 of the respective scanned object in the monitored zone 18 and to determine its distance based thereon. In other embodiments, a different property of the objects can be determined, for instance, their presence or their reflectivity or color. At least parts of the control and evaluation unit 30 can be integrated with the light transmitter 12 or with the light receiver 28 on a common module, for instance, a pattern generation for the sequence of the deflection or pixel-related evaluations or preprocessing steps.

The sensor 10 has a reference target 32 to monitor the operability of the sensor 10, in particular whether the deflection unit 20 actually deflects the transmission light beam 16 to the desired measurement point 22. The reference target 32 is here arranged by way of example at a front screen 34 of the sensor 10 through which the transmission light beam 16 exits and the remitted transmission light beam 24 enters. The reference target 32 can alternatively be arranged inside in the transmission light beam or outside at the front screen 34 or can be integrated into the front screen 34. As regards the lateral positioning, that is the deflection angles at which the reference target 32 is impacted by the transmission light beam 16, and also as regards the design of the reference target 32, a large number of embodiments with one or more smaller and larger reference targets 32 will be presented in the following with reference to FIGS. 6a to 7j.

In the case of FIG. 1, the reference target 32 is passive, that is, it deflects the transmission light beam 16 at a corresponding deflection angle back onto the light receiver 28 and a reference signal is generated there instead of a measurement signal. Various light guides, in particular light guides and reflectors, are conceivable for this purpose. With respect to FIG. 4, an active reference target 32 that generates the reference signal itself will also be explained later.

The transmission light beam 16 is incident overall on the reference target 32 at corresponding deflection angles. Alternatively, only a portion of the transmission light beam 16 can also be decoupled or, for example, the reference target 31 can also be sweepingly impacted in a measurement. In any event, this only occurs after the deflection so that the reference signal actually enables a monitoring of the deflection unit 20. This is different in conventional reference targets that serve for the compensation of internal signal transit times, wherein, conversely, the reference target 32 can, however, also take over these functions.

The reference target 32 is traveled to in the course of the scanning of the monitored zone 18 by the transmission light beam 16, in particular at time intervals corresponding to a required test cycle. A reference signal that is evaluated by the control and evaluation unit 30 then results via a reference light beam 36. A simple evaluation merely determines whether a reference signal is generated at all. A comparison with an expectation about the level of the reference signal can, however, also take place, with a more selective statement concerning this then being possible that also includes contamination in the transmission path, a performance decrease of the light transmitter 12 and the like. A very clear simulation pattern can particularly be generated in the case of a plurality of reference targets 32 or a plurality of part zones having a different, defined damping or reflectivity.

Since the position of the reference target 32 is known, the reference target 32 can also be used for a zero point adjustment. In this respect, an X coordinate system or an X-Y coordinate system is therefore checked, calibrated or regularly tracked transversely to the transmission direction. Furthermore, the distance of the reference target 32 can be measured using a time of flight and can be checked by an expectation, whereby the total measurement channel is then monitored. This is particularly of advantage in safety-relevant applications.

Figure 2:
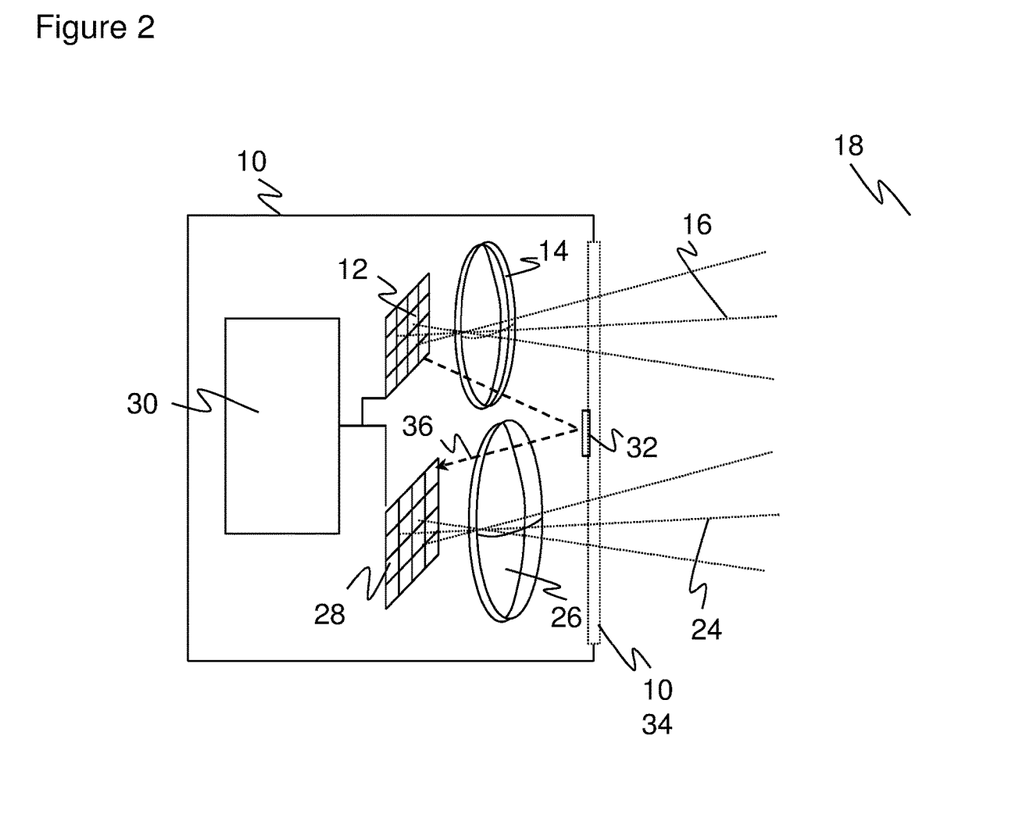
FIG. 2 a schematic representation of a further embodiment of the optoelectronic sensor with beam deflection by a selection among numerous light sources.

FIG. 2 shows a schematic representation of a further embodiment of the sensor 10. In contrast to FIG. 1, an array having a plurality of individual light transmitters controllable individually or group-wise is used as the light transmitter 12 here, for example, a VCSEL array or a matrix arrangement having other light sources such as LEDs or edge emitter laser diodes. By selecting specific active individual light transmitters, a transmission light beam 16 can be transmitted in a specific direction such that this light transmitter 12 simultaneously takes over the function of the deflection unit 20. There would also be other securing possibilities for this embodiment so that the incorrect individual light sources are not accidentally active permanently, but a monitoring with the aid of the reference target 32 is at least possible.

Figure 3:
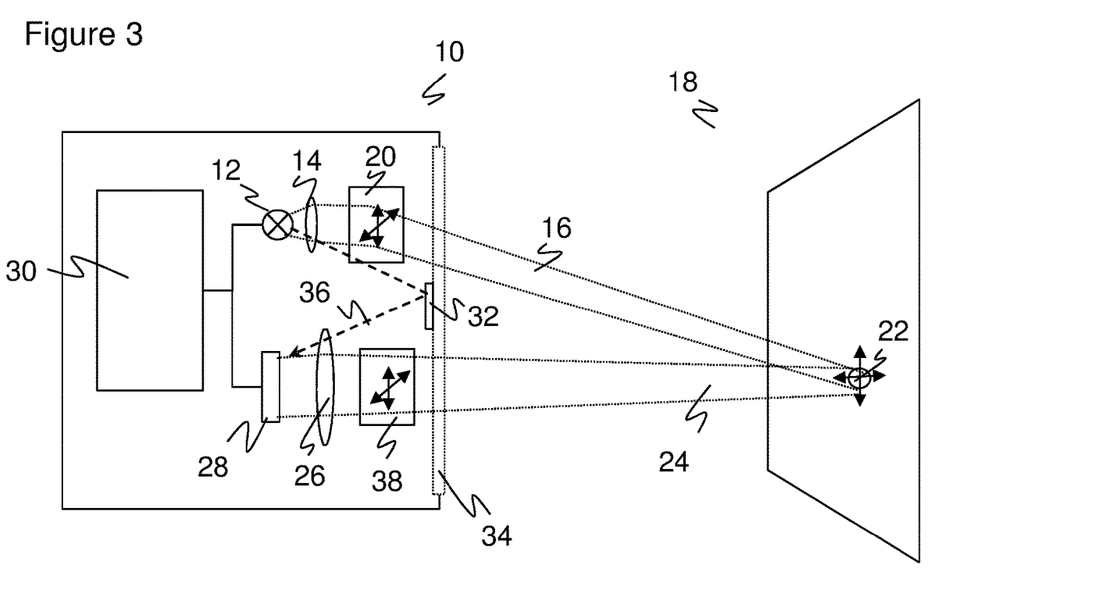
FIG. 3 a schematic representation of a further embodiment of the optoelectronic sensor with beam deflection at the transmission side and at the reception side without moving mechanical parts.

FIG. 3 shows a schematic representation of a further embodiment of the sensor 10. In contrast to FIG. 1, a deflection unit 38 is also provided at the reception side here instead of a matrix arrangement of pixels recording over a large area and only having a subsequent selection. The deflection unit 38 at the reception side can be designed using comparable techniques to the deflection unit 20 at the transmission side and likewise does not have any moving mechanical parts. It is therefore still a solid state scanner even in the sense that a real scanning process takes place at the transmission side and at the reception side. In a further embodiment, not shown, the transmission light beam 16 and the remitted transmission light beam 24 use the same, then common, deflection unit 20, 38.

Figure 4:
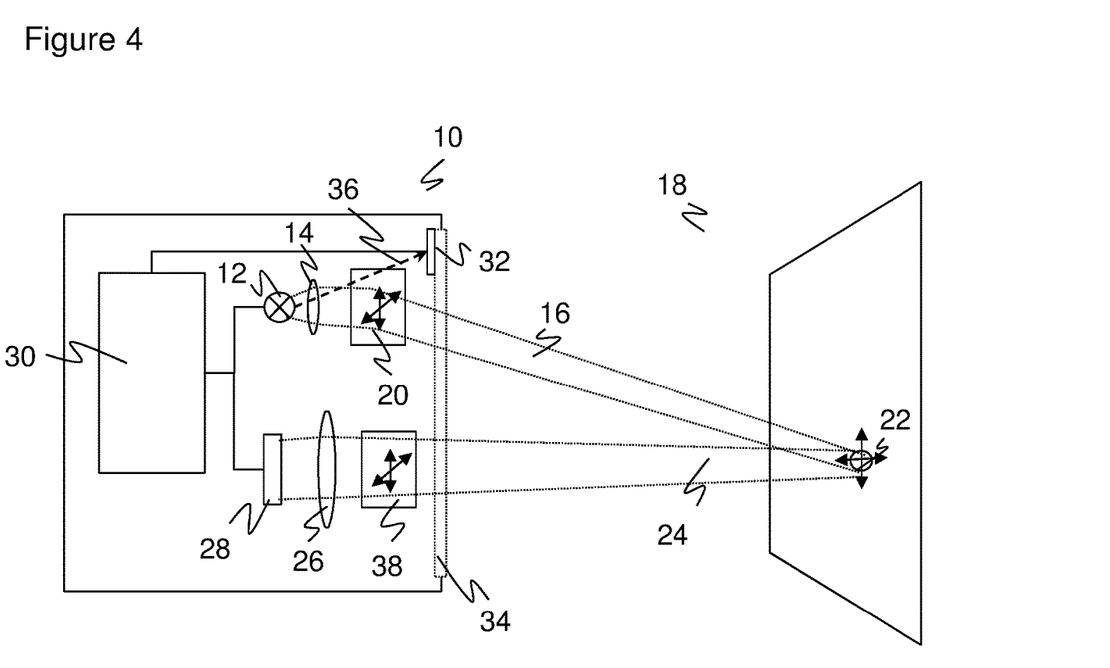
FIG. 4 a schematic representation of a further embodiment of the optoelectronic sensor with an active reference target.

FIG. 4 shows a schematic representation of a further embodiment of the sensor 10. Unlike in the previous embodiments, the reference target 32 is no longer passive, that is, it does not deflect the transmission light beam 16 onto the light receiver 28. The now active reference target 32 rather has an additional reference light receiver that generates the reference signal and transmits it to the control and evaluation unit 30. It is conceivable to first provide a passive beam deflection in the optical path of the reference light beam 36 and to arrange the active reference target 32 in a correspondingly different manner and thus to only illuminate it indirectly by the transmission light beam 20. In addition, the active reference target 32 is indeed shown with a deflection unit 38 at the reception side as in FIG. 3, but it can equally also replace the passive reference target 32 in the embodiments explained with reference to FIGS. 1 and 2. Furthermore, as already mentioned, a plurality of reference targets 32 can be provided in all the embodiments, and indeed also active and passive reference targets 32 in mixed form.

Figure 5:
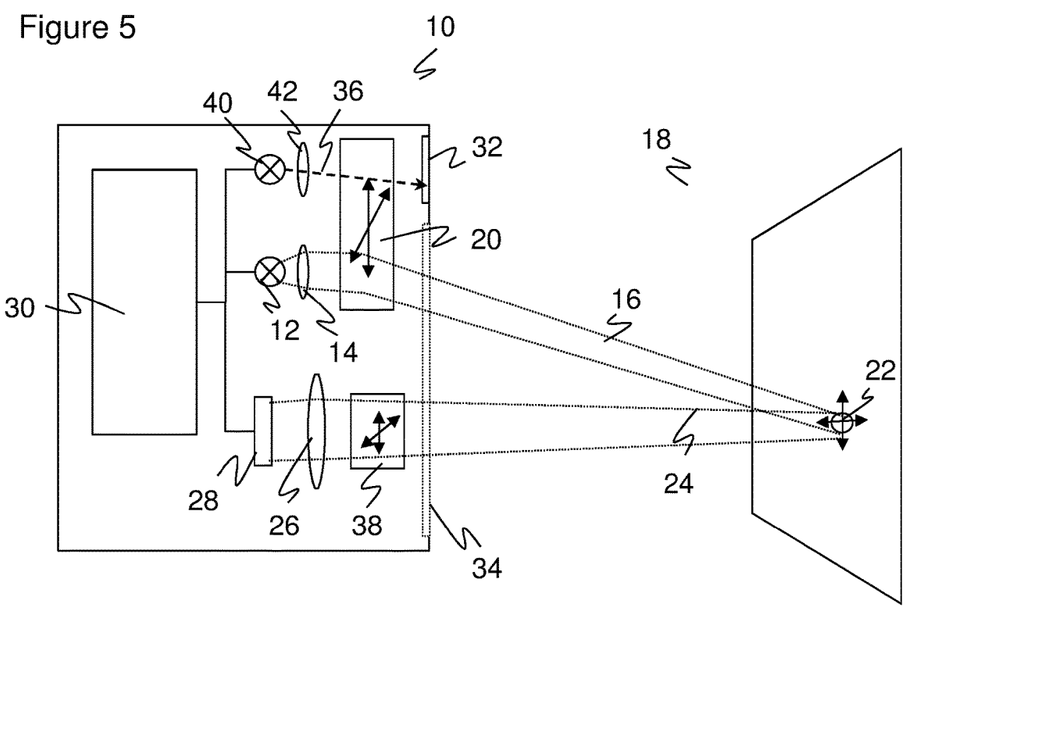
FIG. 5 a schematic representation of a further embodiment of the optoelectronic sensor with an additional reference light beam.

FIG. 5 shows a schematic representation of a further embodiment of the sensor 10. In this embodiment, an additional reference light transmitter 40 is provided with an optional separate collimation optics 43 that generates the reference light beam 36 in addition to the transmission light beam 16. The transmission light beam 16 and the reference light beam 36 are deflected together and in the same manner by the deflection unit 20. The total scanning pattern can thus be tracked in parallel on a spatially resolving active reference target 32. Alternatively, only one position or only some reference positions is/are monitored by a simpler reference target 32. As in all the embodiments, only one deflection can also be provided in a direction; the sensor 10 can therefore be a row scanner and the reference light beam 36 accordingly also only moves in the row direction.

The embodiment with the additional reference light transmitter 40 can also be combined in any desired manner with the embodiments explained with reference to FIGS. 1 to 4. Instead of using an additional reference light transmitter 40, a portion of the transmission light beam 16 can also be decoupled as the reference light beam 26 or a portion of the beam cross-section of the transmission light beam 16 is sweepingly used as the reference light beam 36.

In the following, some exemplary embodiments and arrangements of reference targets 32 will now be described with reference to FIGS. 6a-6d in the case of linear deflection and then with reference to FIGS. 7a to 7j in the case of areal deflection. All of these reference targets can be active or passive and the arrangements and embodiments that are each shown by way of example can also be combined.

Figure 6A:
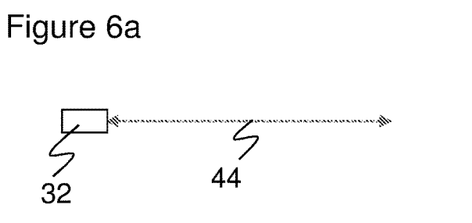
FIG. 6a an exemplary arrangement of the reference target at an end of a one-dimensional scanning zone.

FIG. 6a shows an exemplary arrangement of the reference target 32 at an end of a one-dimensional scanning zone 44 that is indicated by an arrow. Naturally, the reference target 32 can equally be arranged at the other, right end. The scanning zone 44 corresponds to a linear monitored zone 18. The reference target 32 is preferably in each case traveled to cyclically at the start of a row scanning, i.e. the scanning is so-to-say started at a deflection angle that faces somewhat too far to the left for the monitored zone 18. However, it is not absolutely necessary to travel to the scanning zone 44 continuously from left to right, from right to left or to and from, but it is rather possible to jump in a basically random manner in the scanning zone 44 and onto the reference target 32. All of this also applies analogously to the configurations explained in the following.

Figure 6B:
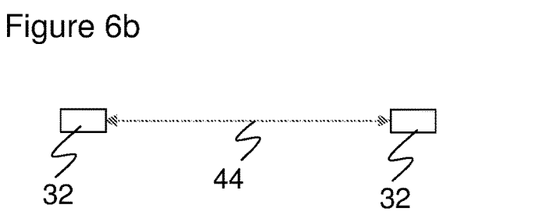
FIG. 6b an exemplary arrangement of reference targets at both ends of a one-dimensional scanning zone.

FIG. 6b shows an exemplary arrangement of reference targets 32 at both ends of a one-dimensional scanning zone 44. In a regular row scan, the deflection is thereby tested somewhat more frequently and in two different positions so that an even more reliable assumption can be made that all the intermediate positions are also correct. In addition, the two known marginal positions of the reference targets 32 can be used to check or to define the coordinate system of the scanning.

Figure 6C:
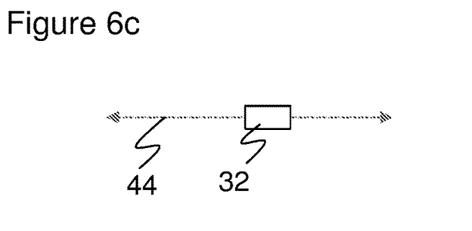
FIG. 6c an exemplary arrangement of the reference target within a one-dimensional scanning zone.

FIG. 6c shows an exemplary arrangement of the reference target 32 within a one-dimensional scanning zone 44. This reference target 32 covers a portion of the relevant measured zone, which is, however, possibly accepted when the margin is not available, for example, with a narrowly restricted possible deflection angle of the deflection unit 20. It is also conceivable that only the parts to the right and to the left of the reference target 32 are relevant for the measurement, that is separated ROIs are scanned and the reference target 32 is arranged in a gap therebetween. It is furthermore conceivable that the reference signal of a partly transparent reference target 32, which is produced before the measurement signal in time due to the shortest light path, is separated in the evaluation or is, for example, filtered by the averaging such that both a measurement takes place and the reference signal is generated at the deflection angle of the reference target 32.

Figure 6D:
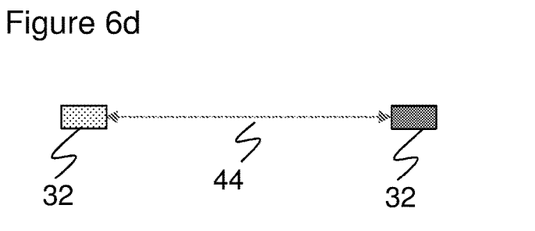
FIG. 6d an exemplary arrangement of reference targets at a one-dimensional scanning zone that generate reference signals of different strengths.

FIG. 6d shows an exemplary arrangement of reference targets 32 similar to FIG. 6b, wherein, however, the two reference targets 32 now generate reference signals of different strengths as indicated by hatching. This can be achieved by different damping processes, blackening processes, reflective properties, reinforcements and similar effects. More precise checks are possible due to the different intensities of the reference signals. More than two reference targets 32 for reference signals of different strengths can also be arranged next to and within the scanning zone 44.

Figure 7A:
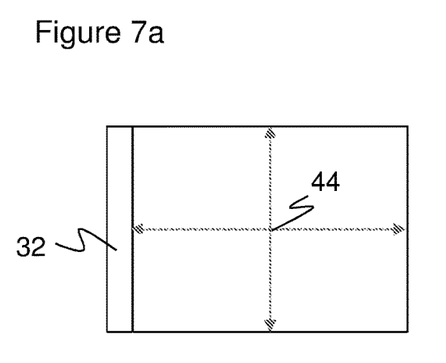
FIG. 7a an exemplary arrangement of a reference target at an edge of a two-dimensional scanning zone.
Figure 7B:
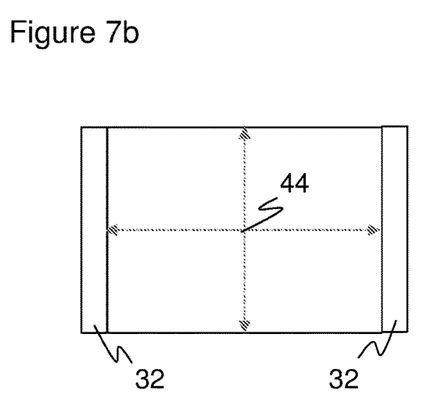
FIG. 7b an exemplary arrangement of reference targets at the two lateral edges of a two-dimensional scanning zone.
Figure 7C:
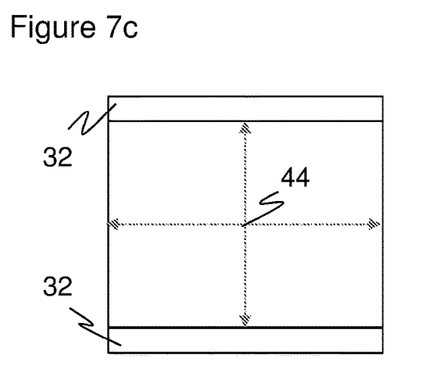
FIG. 7c an exemplary arrangement of reference targets at the upper and lower edges of a two-dimensional scanning zone.
Figure 7D:
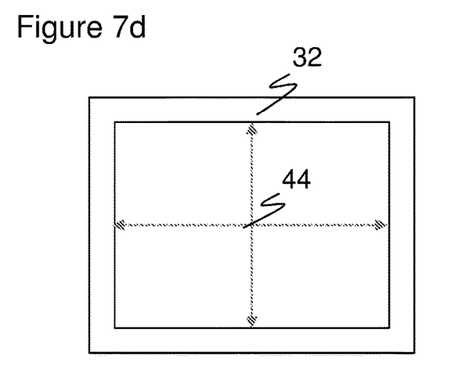
FIG. 7d an exemplary arrangement of reference targets all around at the edges of a two-dimensional scanning zone.

FIGS. 7a-d show exemplary arrangements of reference targets 32 at different edges of a now two-dimensional scanning zone 44. The embodiments in accordance with FIGS. 7a-b with a strip-shaped reference target 32 at the left and/or right margin are particularly suitable for a row-wise scanning, wherein what was said with respect to FIGS. 6a-b then applies analogously per row. An arrangement in accordance with FIG. 7c with a strip-shaped reference target at the upper and/or lower margin is rather suitable for a column-wise scanning. A reference target 32 running around the margin as in FIG. 7d is suitable for a row-wise and column-wise scanning and also for variable patterns. In this respect, no arrangement of reference targets 32 is compulsorily fixed with respect to a specific scanning pattern.

Figure 7E:
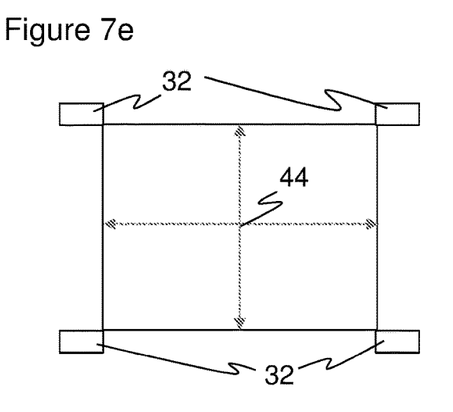
FIG. 7e an exemplary arrangement of reference targets at the corners of a two-dimensional scanning zone.

In the embodiment in accordance with FIG. 7e, reference targets 32 are arranged at at least one corner of the scanning zone 34. These positions include the remaining deflection angles so that their successful monitoring allows a particularly reliable conclusion to be drawn on a functional deflection unit 20.

Figure 7F:
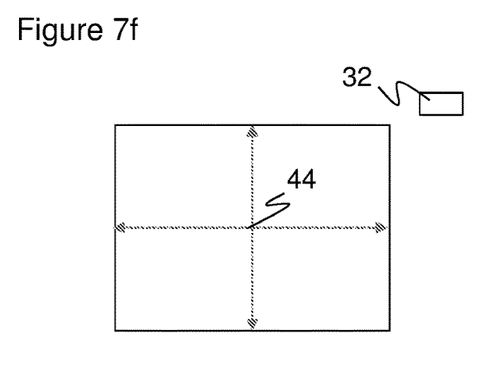

In the embodiment in accordance with FIG. 7f, a reference target 32 is located at any desired position at the margin, as specifically shown spaced apart from the margin or also within the scanning zone 44. This position is not integrated in the typical scanning pattern as has preferably been the case so far, but is rather traveled to abruptly at specific test points in time. A very precise time behavior of the test can thus in particular be predefined and there is complete design freedom as to where the reference target 32 is accommodated.

Figure 7G:
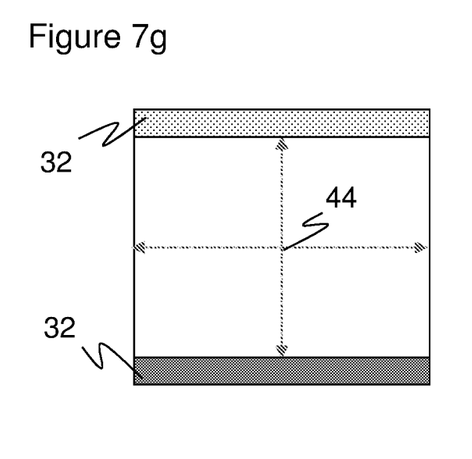
FIG. 7g an exemplary arrangement of reference targets similar to FIG. 7c at the upper and lower edges of a two-dimensional scanning zone that additionally generate reference signals of different strengths.

FIG. 7g shows an exemplary arrangement of reference targets similar to FIG. 7c at the upper and lower edges of a two-dimensional scanning zone that additionally generate reference signals of different strengths. It is so-to-say the two-dimensional analog of the embodiment in accordance with FIG. 7d with completely similar possibilities of use and advantages. Such reference targets 32 for reference signals of different strengths can be attached at any desired positions, in particular at all the positions shown in FIGS. 6a-7i.

Figure 7H:
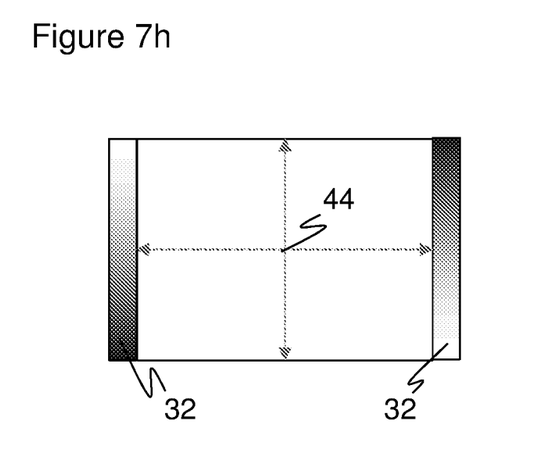
FIG. 7h an exemplary arrangement of reference targets similar to FIG. 7b at the two lateral edges of a two-dimensional scanning zone that generate reference signals of different strengths over their longitudinal extent.

FIG. 7h shows one of these numerous further variants with reference signals of different strengths. In this respect, the level of the reference signal varies in opposite directions over two elongated reference targets 32, wherein the continuous extent shown could be replaced by discrete reference targets 32 and gradations. The specific arrangement with two lateral strips is purely exemplary.

Figure 7I:
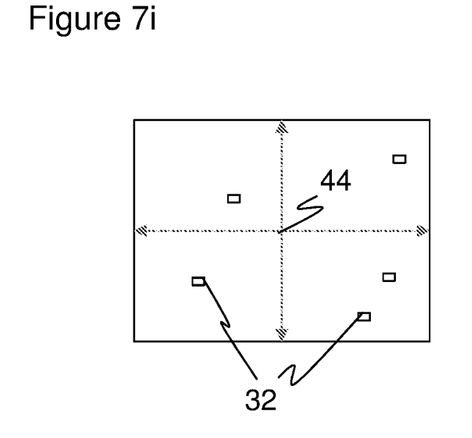
FIG. 7i an exemplary arrangement of reference targets somewhere within a two-dimensional scanning zone.

FIG. 7i shows a further exemplary arrangement of reference targets 32 somewhere within the two-dimensional scanning zone 44. In this respect, further reference targets 32 could be added at the margin and the reference targets 32 could be adapted for reference signals of different strengths. As already briefly explained with respect to FIG. 6c, when reference targets 32 are arranged within the scanning zone, there is an interaction with the actual measurement that is, however, accepted as a kind of dead pixel, for example, that anyway only relates to gaps between ROIs or that is compensated by a skillful evaluation, wherein the temporal separation mentioned with respect to FIG. 6c is one example of a skillful evaluation and a further example will now be explained in a concluding manner.

Figure 7J:
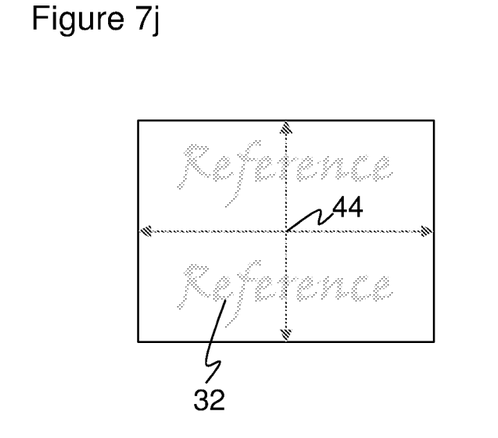
FIG. 7j an exemplary arrangement of partly transparent reference targets in a two-dimensional scanning zone that form a pattern.

FIG. 7j shows an exemplary arrangement of partly transparent reference targets 32 in a two-dimensional scanning zone 44 that form a pattern. This can be understood as a complex variation of the embodiment in accordance with FIG. 7i. The pattern forms a kind of watermark. The reference signals can possibly be separated from the measurement signals by a temporal separation. This is not always possible, for example, since the control and evaluation unit 30 is too slow or is no longer capable of multiple targets, that is, it in particular does not record the time curve of the reception signal at all. The fact can then be used that the pattern of the reference targets 32 is always imparted to or superposed on all the reception signals. At least in sufficiently dynamic scenes, for instance in mobile applications, the contributions of the object remissions from the monitored zone 18 are distributed very differently, in simple terms, distributed randomly. If an averaging is therefore carried out over a plurality of scans, the pattern emerges in a recognizable manner in so doing.

The invention claimed is:

1. A method of detecting objects in a monitored zone, in which a transmission light beam is transmitted and is deflected by a deflection unit at a deflection angle to scan the monitored zone, wherein the deflection takes place without a movement of mechanical parts or at most a movement of micromechanical parts, and wherein the transmission light beam remitted from the objects is received again and a reception signal generated therefrom is evaluated to determine information on the objects, wherein at least a portion of the deflected transmission light beam is received or reflected by a reference target at at least one deflection angle of the deflection unit in order to generate a reference signal by means of which operability of the deflection unit is checked.

2. The method of detecting objects in a monitored zone in accordance with claim 1, wherein the reference target has a reference light receiver that generates the reference signal.

3. The method of detecting objects in a monitored zone in accordance with claim 1, wherein the reference target is arranged at a deflection angle that is disposed outside the monitored zone.

4. The method of detecting objects in a monitored zone in accordance with claim 1, unit further comprising periodically scanning at least one of a row and a two-dimensional pattern with the aid of the deflection unit.

5. The method of detecting objects in a monitored zone in accordance with claim 1, wherein the reference target is arranged at a front screen of an optoelectronic sensor.

6. The method of detecting objects in a monitored zone in accordance with claim 1, wherein the reference target has a pattern of partly reflective elements in an optical path of the transmission light beam at different deflection angles.

7. The method of detecting objects in a monitored zone in accordance with claim 1, further comprising generating a reference light beam that is offset with respect to the transmission light beam and that is deflected by the deflection unit with the transmission light beam.

8. The method of detecting objects in a monitored zone in accordance with claim 1, further comprising deflecting the transmission light beam at a deflection angle corresponding to the reference target with the aid of the deflection unit at a test point in time.

9. The method of detecting objects in a monitored zone in accordance with claim 1, further comprising checking an angular origin of the at least one deflection angle by means of the reference signal.

10. The method of detecting objects in a monitored zone in accordance with claim 1, further comprising defining an angular origin of the at least one deflection angle by means of the reference signal.

11. The method of detecting objects in a monitored zone in accordance with claim 1, wherein a light receiver has a plurality of light reception elements that are each associated with different deflection angles.

12. The method of detecting objects in a monitored zone in accordance with claim 11, further comprising activating or reading out only respective ones of the light reception elements that correspond to a respective current deflection angle of the transmission light beam.

13. The method of detecting objects in a monitored zone in accordance with claim 11, wherein the light reception elements are SPADs.

14. The method of detecting objects in a monitored zone in accordance with claim 1, further comprising returning the remitted transmission light beam from the deflection angle onto the light receiver using a second deflection unit.

15. The method of detecting objects in a monitored zone in accordance with claim 1, further comprising determining a time of flight of the transmission light beam up to the reception of the remitted transmission light beam.

16. The method of detecting objects in a monitored zone in accordance with claim 15, further comprising checking a distance of each of the reference target targets.

* * * * *